United States Patent [19]
Kost et al.

[11] Patent Number: 5,154,494
[45] Date of Patent: Oct. 13, 1992

[54] METHOD FOR CONVERTING A SIGNAL WHICH CORRESPONDS TO A DESIRED PRESSURE

[75] Inventors: Friedrich Kost, Stuttgart; Karl-Josef Weiss, Waiblingen; Anton van Zanten, Ditzingen, all of Fed. Rep. of Germany

[73] Assignee: Robert Bosch GmbH, Stuttgart, Fed. Rep. of Germany

[21] Appl. No.: 857,709

[22] Filed: March 25, 1992

Related U.S. Application Data

[63] Continuation of Ser. No. 466,371, filed as PCT/EP88/00843, Sep. 15, 1988, abandoned.

[30] Foreign Application Priority Data

Sep. 16, 1987 [DE] Fed. Rep. of Germany ....... 3731076

[51] Int. Cl.$^5$ ............................ B60T 8/32; B60T 13/68
[52] U.S. Cl. ................................ 303/103; 188/181 R; 303/15; 303/DIG. 4
[58] Field of Search ................. 303/102-111, 303/DIG. 4, DIG. 3, 15, 20, 94, 95, 92; 364/426.01, 426.02, 426.03; 180/197; 188/181 A, 181 R, 181 C

[56] References Cited

U.S. PATENT DOCUMENTS

| | | | |
|---|---|---|---|
| 4,344,137 | 8/1982 | Skarvada | 303/109 X |
| 4,938,544 | 7/1990 | Braschel et al. | 303/103 |
| 5,016,179 | 5/1991 | Utzt | 303/103 X |

FOREIGN PATENT DOCUMENTS

| | | |
|---|---|---|
| 0188686 | 7/1986 | European Pat. Off. . |
| 0226803 | 7/1987 | European Pat. Off. . |
| 0233360 | 8/1987 | European Pat. Off. . |
| 8902384 | 3/1989 | World Int. Prop. O. .... 303/DIG. 4 |

*Primary Examiner*—Douglas C. Butler
*Attorney, Agent, or Firm*—Felfe & Lynch

[57] ABSTRACT

A process is described for controlling the brake pressure wherein a brake pressure is supplied which corresponds to the desired signal. This pressure is measured. The factors $b^{+/-}$ and the response times $T_o^{+/-}$ are identified from the pressure pulses P in the individual control cycles and the actuating times $\pm T$ of the valves and they are used to convert the desired signal $P^x$ into a control signal $\pm T$ of such a length that the desired pressure is supplied.

4 Claims, 3 Drawing Sheets

METHOD FOR CONVERTING A SIGNAL WHICH CORRESPONDS TO A DESIRED PRESSURE

This application is a continuation of application Ser. No. 07/466,371, filed as PCT/EP88/00843, Sep. 15, 1988, now abandoned.

BACKGROUND OF THE INVENTION

The invention relates to a method for converting a signal P* which corresponds, particularly, to a desired brake pressure into a control signal $\Delta T$ which and actuates a brake pressure control device for a certain period of time, wherein a measuring device measures the generated pressure and supplies a corresponding signal P.

It is known, for example, to supply a brake pressure to the wheel brake cylinder of a vehicle which corresponds to a signal characterizing a desired brake pressure. For this purpose, the brake pressure supplied is measured and the measured signal is compared to the desired value. A possibly occurring deviation causes a valve device to be actuated which increases or decreases the brake pressure until the desired brake pressure is reached.

SUMMARY OF THE INVENTION

According to the invention, the length of the control signal T (K+1) in the control interval (K+1) is determined by the difference between the signal $P^*(K+1)$ representing the desired pressure and the signal P(K) representing the pressure supplied in the preceding control interval (K), as well as a gain factor $b^{+/-}$ and a response to $TO^{+/-}$. Estimated values for the gain factor $b^{+/-}$ and the response time $TO^{+/-}$ of the brake pressure control unit are determined from the preceding pressure differences $P(j)-P(j-1)$ and $P(j-1)-P(j-2)$, as well as the actuating times $\Delta T(j)$ and $\Delta T(j-1)$, where j is the identification index.

As compared to the state of the art, it is an advantage of the invention that the desired pressure can be supplied faster and more accurately. The invention can be used with ABS or ABR, for example. It is a further advantage that the method permits drawing conclusions regarding the condition of the brake system.

DETAILED DESCRIPTION OF THE PREFERRED EMBODIMENTS

Figure 1:
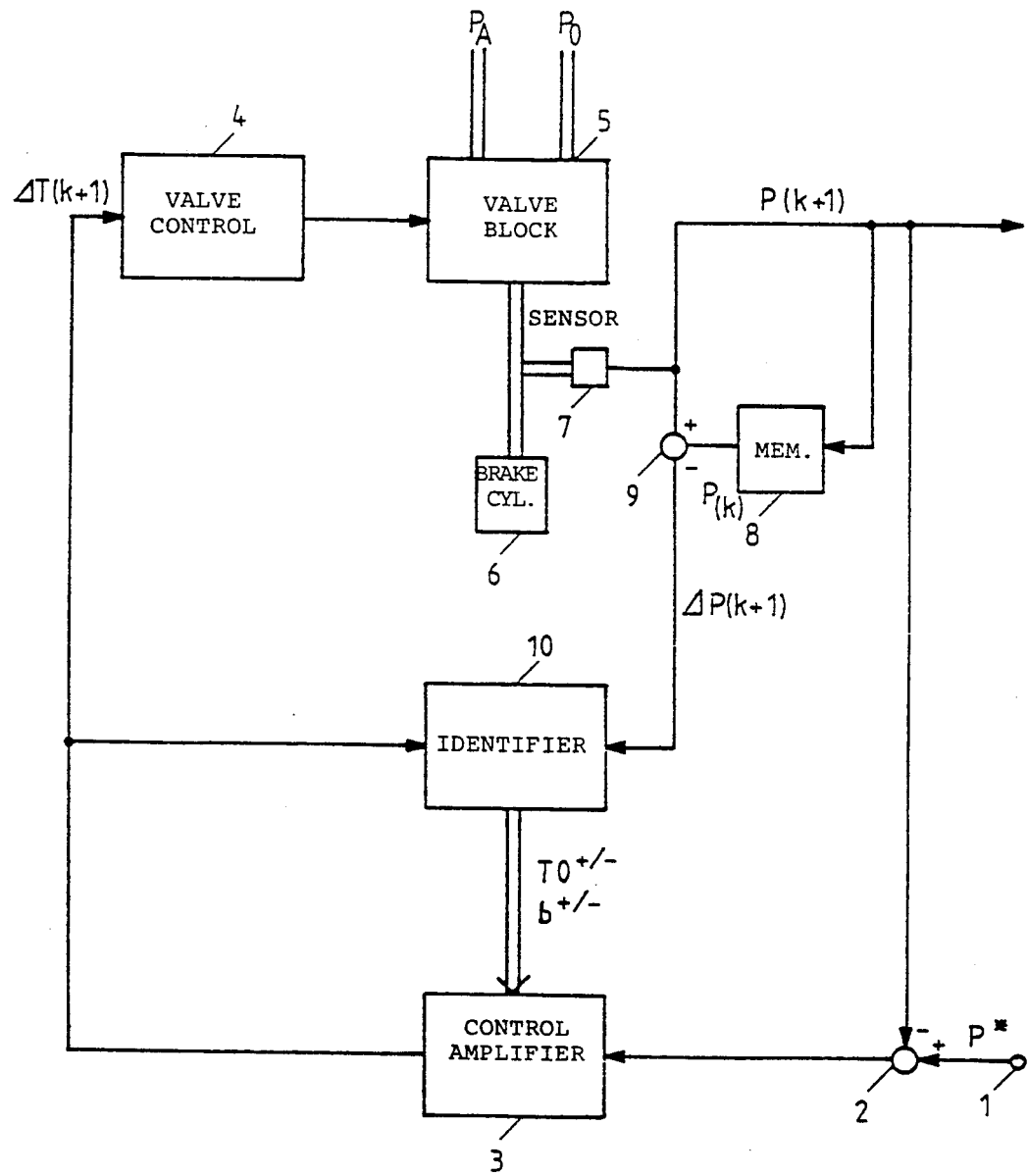
FIG. 1 is a block diagram for carrying out the process.

In FIG. 1 a signal P* which corresponds to the desired pressure is supplied at a terminal 1 and at the overlapping point 2 a counter signal is supplied corresponding to the pressure in the wheel brake cylinder. The difference signal is supplied to a control amplifier 3 using this given signal to generate a control signal $\Delta T$ which corresponds to the time required at the instantaneously prevailing conditions in order to increase or decrease the pressure to match the desired pressure. The signal at terminal 1 can be a digital signal and the difference can be digitally formed and further processed. The preceding sign of the signal $\Delta T$ determines whether pressure is to be increased or decreased. No signal means maintaining the condition. The signal $\Delta T$ is supplied to a valve control logic 4 which opens an inlet valve or an outlet valve in brake pressure control device 5 corresponding to the preceding sign of signal T and thus connects a supply pressure PO or a low pressure Pa to a wheel brake cylinder 6. Normally, the valve control logic 4 keeps the inlet valve EV from PO and the outlet valve AV to Pa closed and opens one when the signal $\pm \Delta T$ occurs. A sensor 7 measures the brake pressure. The measured signal P is supplied to the overlapping point 2, a memory 8 and an overlapping point 9.

Measuring, storing and evaluating is carried out in small time intervals T between time points k,(k+1), . . . The brake pressure sensed in the respectively preceding interval is stored in the memory 8. Assuming that the sensor 7 senses the brake pressure P(K+1) in the (K+1)nth interval then the brake pressure P(K) is stored in the memory. The magnitude of the pressure bounce $\Delta p(K+1)$ is formed at the output of the overlapping site 9.

Figure 2:
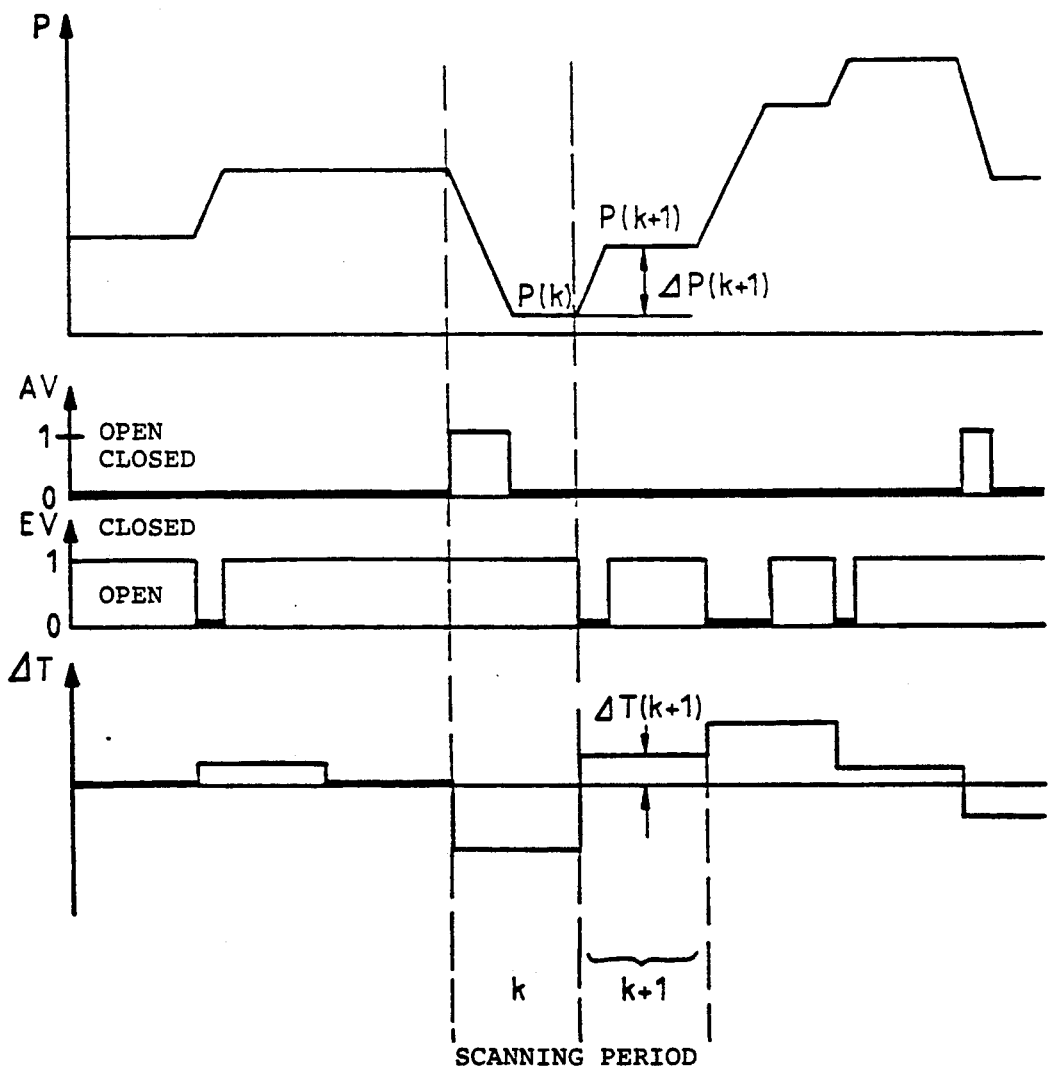
FIG. 2 shows plots of the brake pressure, valve positions, and control signals versus time.

FIG. 2 shows the pressure curve P and the actuating signals for the valve as well as the appertaining curve of the signal $\Delta T$. The pressure bounce $\Delta P(K+1)$ and the control signals $\Delta T$ are also supplied to an identifier 10 which generates the signals $TO^{+/-}$ and $b^{+/-}$.

The valves in block 5 are actuated by means of the valve actuating logic 4 in the control interval k+1 based on the actuating signal $\Delta T(k+1)$ which is subject to the following conditions:

$\Delta T(k+1) > 0$: The inlet valve is opened for a period of time $|\Delta T(k+1)|$ and then closed again. The outlet valve remains closed. Pressure is built up for the time $|\Delta T(k+1)|$.

$\Delta T(k+1) - 0$: The outlet valve is opened for a period of time $|\Delta T(k+1)|$ and then closed again. The inlet valve remains closed. Pressure is decreased for the time $|\Delta T(k+1)|$.

$\Delta T(k+1) = 0$: Inlet valve and outlet valve remain closed (pressure is maintained constant).

The actuating signal $\Delta T(k+1)$ causes a pressure bounce of $\Delta P(k+1)$.

The following simple model describes the relationship between $\Delta T$ and $\Delta P$ fairly well:

$$\begin{aligned} \Delta P(k+1) &= P(k+1) - P(k) = b^+(P(k), PO) * (\Delta T(k+1) + TO^+) \text{ for } \Delta T(k+1) > -TO^+, \\ \Delta P(k+1) &= P(k+1) - P(k) = b^-(P(k), Pa) * (\Delta T(k+1) + TO^-) \text{ for } \Delta T(k+1) < -TO^-, \\ \Delta P(k+1) &= P(k+1) - P(k) = 0 \quad \text{for } -TO^- < \Delta T(k+1) < -TO^+ \end{aligned} \quad (1)$$

The gain factors $b^+$ and $b^-$ are a function of the pressure due to the effects of the absorption characteristic of the brake hydraulics and the effect of the pressure differences present at the valve.

Figure 3:
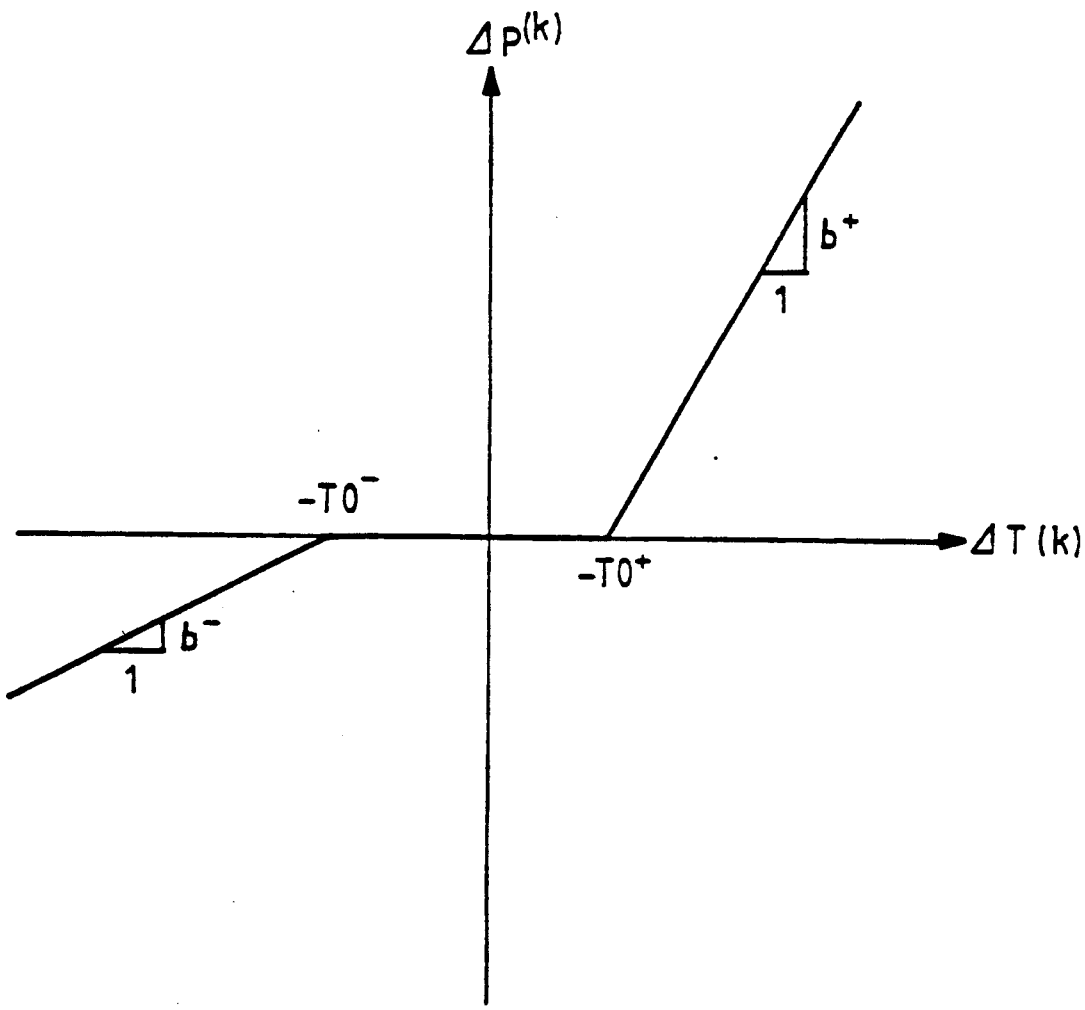
FIG. 3 is a plot of the pressure bounce against the actuating values.

The values of $b^+$ and $b^-$ can differ greatly. The effect of electric and mechanical inertia of the valve is modelled by the response times $TO^+$ and $TO^-$. FIG. 3 illustrates the relationship between the actuating value $\Delta T(k+1)$ and the pressure bounce $\Delta P(k+1) = P(k+1) - P(k)$ while neglecting the pressure dependency of $b^+$ and $b^-$.

Based on this model, control 3 calculates the actuating value $\Delta T(k+1)$ according to the condition $$\left. \begin{array}{l} \Delta T(k+1) = (P^*(k+1) - P(k))/b^+ - TO^- \\ \text{for } P^*(k+1) > P(k), \\ \Delta T(k+1) = (P^*(k+1) - P(k))/b^- - TO^- \\ \text{for } P^*(k+1) < P(k). \\ \Delta T(k+1) = 0 \\ \text{for } P^*(k-1) = P(k). \end{array} \right\} \quad (2)$$

Here, $P^*(k+1)$ means a desired pressure value which can be obtained with the actuating signal $\Delta T(k+1)$. The values $b^+$, $b^-$, $TO^+$, $TO^-$ are estimated values for the real parameters $b^+(P,PO)$, $b^-(P, Pa)$, $to^+$, $TO^-$. As subsequently described, the values can be identified on-line in the identifier 10.

The basis for an identification are measuring equations of the form:

$$\begin{array}{l} z(j) = b^+ * \Delta T(j) + b^{+*}TO^+ \quad \text{for } \Delta T(j) > 0, \\ z(j) = b^- * \Delta T(j) + b^{-*}TO^- \quad \text{for } \Delta T(j) < 0, \end{array} \quad (3)$$

wherein $z(j) = P(j) - P(j-1)$ is the pressure bounce and $\Delta T(j) = \Delta T(k)$, if $\Delta T(k) \neq 0$. J ... is the identification index (update of $b^{+/-}$ and $\Delta TO^{+/-}$, k is the sensing index. An identification at time point k is possible only when $\Delta T(k) \neq 0$.

Within a small range of a pressure working point, it is possible to assume $b^+$ and $b^-$ to be constant. Passing broader pressure ranges can lead to incorrect estimates of these parameters. The measurements for build-up and decrease must be processed separately, since $b^+$, $TO^+$ are different from $b^-$, $TO^-$. Known processes for the measurements are, for example, recursive least squares-processes. This, however, is to describe a process which is further designed to match this particular problem.

The procedures for determining $b^+$, $TO^+$, hence $\Delta T(j) > 0$, serves as an example for a more simple description of the process.

A new determination according to equation (3) is present at the identification time point j. First, it must be checked whether a reaction $z(j)$ followed the actuating value $\Delta T(j)$. If this is not the case, the response time $-TO^+ = b^+(\Delta T(j-1) + TO^+)$ has not been exceeded. Therefore, a new estimate according to the relationship $$TO^+(j) = \Delta T(j)^*Sm + TO^+(j-1)^*(1-Sm) \quad (4)$$

was executed in this case. Herein, $TO^+(j-1)$ is an a priori estimated value for $TO^+$ and $Sm$ is a constant weighting factor. This case does not permit a new estimate for the gain factor $b^+$. Point B1 of enclosure 1 gives the corresponding value $TO^-(j)$.

If there was a reaction $z(j)$ following $\Delta T(j)$, it is possibel to determine new estimates $b^+(k)$ and $TO^+$ form the equation (3) together with the preceding measurement $$z(j-1) = b^{30}*\Delta T(j-1) + b^{+*}TO^+ \quad (5)$$

A direct solution of the equation (3) and (5) results from $$b1^+(j) = (z(j) - z(j-1)/(\Delta T(j) - \Delta T(j-1)),$$

$$TO1^+(j) = (\Delta T(j)^*z(j-1) - \Delta T(j-1)^*z(j) - z(j-1)). \quad (6)$$

$b1^+(k)$ cannot be determined rom the equation (6) when $\Delta T(j) = T(j-1)$ applies. $TO1^+(j)$ cannot be determined when $z(j) = z(j-1)$ is fulfilled. In these cases no information on $b^+$ and $TO^+$ can be gathered from the two measurements. These cases can be accounted for by not using $b1^+(j)$ and $TO1^+$ determined according to equation (6) as the new estimates $b^+(j)$ and $TO^+(j)$ but the weighted average values from $b1^+(j)$ and $b^+(j-1)$ as well as $TO1^+(j)$ and $TO^+(j-1)$. The weighting factor for $b1^+(j)$ must be selected such that it disappears for $\Delta T(j) = \Delta T(j-1)$, analogously thereto, the factor for $TO1^+(j)$ must disappear when $z(j) = z(j-1)$. The following weighting factors fulfill this requirement $$(\Delta T(j) - \Delta T(j-1))^2/((\Delta T(j) - \Delta T(j-1))^2 + u^2)$$
for weighting $b1^+(j)$
$$(z(j) - z(j-1))^2/((z(j) - z(j-1))^2 + v^2)$$
for weighting $TO1^+(j)$ When $$x(k) = \Delta T(j) - \Delta T(j-1),$$

$$y(j) = z(j) - z(j-1)$$

the entire prescribed calculation for the new estimates $b^+(j)$ and $TO^+(j)$ hence are $$b^+(j)^* \times (j) + u^{2*}b^+(j-1))/(x(j)^2 + u^2),$$

$$TO^+(j) = \{(\Delta T(j)^*z(j-1) - \Delta T(j-1)^*z(j))^*y(j) + v^{2-} \\ *TO^+(j-1)\}/(y(j)^2 + v^2), \quad (7)$$

The corresponding values for $b^-(j)$ and $TO^-(j)$ can be taken from point B2 in enclosure 1.

The convergence speed of the estimates can be separately affected by means of the constant values u and v.

The same procedure applies to the determination of $b^-(j)$ and $TO^-(j)$ when $\Delta T(j) - 0$. For $\Delta T(j) = 0$, there is no new parameter estimate, i.e. the index j does not increase.

According to equation (2), the estimated parameters $b^+$, $b^-$, $TO^+$ and $TO^-$ are required for calculating the actuating signal and, hence, are supplied to the control amplifier 3. Moreover, especially $b^+$ can be used to terminate an ABS control when the required supply pressure PO is not available. In this case, $b^+$ will be very small.

If the supply pressure PO is measured in addition to the wheel brake pressures, $b^+$ and $b^-$ can be used to further specify the functioning of the brake system. If the values for $b^+$ and $b^-$ are too small despite a sufficient pressure difference, it must be assumed that air is in the brake system. Great $TO^+$ and $TO^-$ indicate jammed valves.

Enclosure 1

The entire algorithm for the new estimates $b^+(j)$, $b^-(j)$, $TO^+(j)$ and $TO^-(j)$ are:

A) $\Delta T(k) > 0$:
$\Delta T^+(j-1) = \Delta T^+(j), z^+(j-1) = z^+(j), \Delta T^+(j) = \Delta T(k),$
$z^+(j) = P(k) - P(k-1)$ A1) $z^+(j) = 0$:
$TO^+(j) = -\Delta T(j) * Sm + TO^+(j-1) * (1-Sm)$ Proceed to next sensing A2) $z^+(j) \neq 0$:
$x(j) = \Delta T^+(j) - \Delta T^+(j-1),$
$y(j) = z^+(j) - z^+(j-1),$ -continued $b^+(j) = (y(j) * x(j) + u^2 * b^+(j-1))/(x(j)^2 + u^2)$,
$TO^-(j) = \{(\Delta T^+(j) * z^-(j-1) -$
$\quad \Delta T^-(j-1)) * z^+(j)) * y(j) +$
$\quad v^2 * TO^+(j-1)\}/(y(j)^2 + v^2)$ Proceed to next sensing B) $\Delta T^+(k) < 0$:
$\Delta T^-(j-1) = \Delta T^-(j), z^-(j-1) = z^-(j), \Delta T^-(j) = \Delta T(k),$
$z^-(j) = P(k) - (P(k-1)$ B1) $z^-(j) = 0$:
$TO^-(j) = -\Delta T^-(j) * Sm + TO^-(j-1) * (1 - Sm)$ Proceed to next sensing B2) $z^-(j) \neq 0$:
$x(j) = \Delta T^-(j) - \Delta T^-(j-1),$
$y(j) = z^-(j) - z^-(j-1),$
$b^-(j) = (y(j) * x(j) + u^2 * b^-(j-1))/(x(j)^2 \; u^2),$
$TO^-(j) = \{(\Delta T^-(j) * z^-(j-1) -$
$\quad \Delta T^-(j-1) * z^-(j)) * y(j) +$
$\quad v^2 * TO^-(j-1)\}/(y(j)^2 + v^2)$ Proceed to next sensing C) $\Delta T(k) = 0$:
No new estimate.

Proceed to next sensing

Formula signs used:

| | |
|---|---|
| P | wheel brake pressure |
| $\Delta T$ | actuating value |
| P | pressure bounce |
| $\Delta P^*$ | desired value |
| PO | prepressure |
| PA | surrounding pressure |
| b+/− | gain factor for pressure build-up/decrease |
| TO+/− | response time of inlet/outlet valve |
| z | measuring value in identification equation |
| Sm, u, v | weighting factors |
| x, y | intermediate values |
| b1+, TO1+ | intermediate values |
| k | index for control interval |
| j | index for identification |
| $T_A$ | period of control interval |

We claim:

1. Process for actuating a brake pressure control device to achieve a desired pressure p*, said process comprising the following steps:
   measuring the pressure controlled by the pressure control device at control time points k, (k+1), . . . . separate by control intervals $T_A$ and generating corresponding brake pressure signals (k), P(k+1), . . . . ,
   generating a desired pressure signal P*(k), P*(k+1) . . . at time points k, (k+1), . . . . ,
   storing the measured pressure signals P(k), P(k+1), . . . during the following intervals $T_A$,
   calculating in the control interval $T_A$ following the time point (k+1), a pressure bounce $\Delta P(k+1)$ as the difference P*(k+1)−P(k),
   determining actuating value $\Delta T(k+1)$ from the pressure bounce $\Delta P(k+1)$ according to the relationships $\Delta T(k + 1) =$
   $(P^*(k + 1) - P(k))/b^+(j) - TO^+(j)$ for $P^*(k + 1) > P(k),$ $\Delta T(k + 1) =$
   $(P^*(k + 1) - P(k))/b^-(j) - TO^-(j)$ for $P^*(k + 1) < P(k),$ $\Delta T(k + 1) = 0$ for $P^*(k + 1) = P(k)$ wherein b+/b− are gain factors and TO+/TO− are response times of the pressure control device estimated from former pressure bounces P(j−1)−P(j−2), p(j)−P(j−1), . . . . and former actuating values $\Delta T(j-1), \Delta T(j)$ . . . . at identification time points (j−1), j, . . . and
actuating said control device for a time corresponding to $|\Delta T(+1)|$.

2. Process in accordance with claim 1 further comprising checking whether the brake pressure control device responded to the last formed control signal $\Delta T(k)$ and in case of no response, determining an estimated value TO(j) from the last determined response time TO(j−1) and the control signal $\Delta T(j)$ using weighing factors Sm.

3. Process in accordance with claim 1 wherein b+/b− and TO+/TO− are functions of j recovered according to the equation $b^+(j)=(y(y)*x(j)+u^2*b^+(j-1)/(x(j)^2+u^2),$ $TO^+(j)=\{(\Delta T(j)*z^+(j-1)-\Delta T(j-1)$
$\quad *z^+(j))*y(j)+v^2*TO^+(j-1)\}/(y(j)^2+v^2)$ $b^-(j)=(y(j)*x(j)+u^2 \cdot b^-(j-1)/(x(j)^2+u^2)$ $TO^-(j)=\{(\Delta T(j)*z^-(j-1)-\Delta T^-(j-1)*$
$\quad z^-(j))*y(j)+v^2*T_o^-(j-1)\}/(y(j)^2+v^2)$ wherein $x(j)=\Delta T(j)-\Delta T(j-1)$ $y(j)=z(j)-z(j-1)$ $z(j)=P(k)-P(k-1)$ and u and v are constants.

4. Process as in claim 1 wherein said device comprises an inlet valve and an outlet valve, said inlet valve being opened for a time $|\Delta T(k+1)|$ when P*(k−1)>P(k), said outlet valve being opened for a time $|\Delta T(k+1)|$ when P*(k+1)<P(k).

* * * * *

UNITED STATES PATENT AND TRADEMARK OFFICE
CERTIFICATE OF CORRECTION

PATENT NO.   : 5,154,494
DATED        : October 13, 1992
INVENTOR(S)  : Kost et al.

It is certified that error appears in the above-indentified patent and that said Letters Patent is hereby corrected as shown below:

Abstract, line 3: Change "This" to --The actual brake--.
Abstract, line 4: Insert --gain-- before "factors".
Abstract, line 4: Change "$T_0^{+/-}$" to --$TO^{+/-}$--.
Abstract, line 5: Change "pulses P" to --bounce $\Delta P$--.
Abstract, line 6: Change "+T" to --+$\Delta T$--.
Abstract, line 7: Change "$\overline{P}x$" to --$\overline{P}*$--.
Abstract, line 8: Change "+T" to --+$\Delta T$--.
Col. 1, line 28, change "$\overline{T}(K+1)$" to --$\Delta T(K+1)$--.
Column 1, line 42: Change "ABS or ABR" to --ABS or ASR--.
Column 2, line 39: Change "$\Delta T(K+1)-0$" to --$\Delta T(K+1) < 0$--.
Column 3, line 16: Change "$to^+$" to --$TO^+$--.
Column 3, line 57: Change "$TO^+$form" to --$TO^+$ from--.
Column 3, line 60: Change "$z(j-1) = b^{30}$" to --$z(j-1) = b^+$--.
Column 3, line 66: change "determined ram" to --determined from--.
Column 4, line 26: Change "$b^+(j)*$" to --$b^+(j) = (y(j)^*$--.

UNITED STATES PATENT AND TRADEMARK OFFICE
CERTIFICATE OF CORRECTION

PATENT NO. : 5,154,494
DATED : October 13, 1992
INVENTOR(S) : Kost et al.

It is certified that error appears in the above-indentified patent and that said Letters Patent is hereby corrected as shown below:

Column 4, line 36: Change "$\Delta T(j)-0$" to --$\Delta T(j)<0$--.

Col. 5, line 33, (Formula Signs) Change "P  pressure bounce" to --$\Delta P$  pressure bounce--.

Col. 5, line 34, (Formula Signs) Change "$\Delta P^*$  desired value" to --$P^*$  desired value--.

Column 6, line 20: Change "$p(j)$" to --$P(j)$--.

Column 6, line 24: Change "$|\Delta T(+1)|$" to --$|\Delta T(k+1)|$--.

Column 6, line 35: Change "$b^+(j) = (y(y)^*$" to --$b^+(j) = (y(j)^*$--.

Column 6, line 55: Change "$P^*(k-1)>P(k)$" to --$P^*(k+1)>P(k)$--.

Signed and Sealed this

Thirty-first Day of January, 1995

Attest:

BRUCE LEHMAN

Attesting Officer    Commissioner of Patents and Trademarks